(12) United States Patent
Hager et al.

(10) Patent No.: US 10,323,212 B2
(45) Date of Patent: *Jun. 18, 2019

(54) POLYOLS SUITABLE FOR HOT MOLDED FOAM PRODUCTION WITH HIGH RENEWABLE RESOURCE CONTENT

(75) Inventors: Stanley L. Hager, Cross Lanes, WV (US); Micah N. Moore, Red House, WV (US); Jack R. Reese, Coraopolis, PA (US); Brian L. Neal, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 1080 days.

This patent is subject to a terminal disclaimer.

(21) Appl. No.: 13/641,890

(22) PCT Filed: Apr. 15, 2011

(86) PCT No.: PCT/US2011/000685
§ 371 (c)(1),
(2), (4) Date: Dec. 20, 2012

(87) PCT Pub. No.: WO2011/133208
PCT Pub. Date: Oct. 27, 2011

(65) Prior Publication Data
US 2013/0210951 A1    Aug. 15, 2013

Related U.S. Application Data

(60) Provisional application No. 61/327,262, filed on Apr. 23, 2010.

(51) Int. Cl.
| | |
|---|---|
| C11C 3/00 | (2006.01) |
| C11C 3/04 | (2006.01) |
| C08G 18/36 | (2006.01) |
| C08G 18/40 | (2006.01) |
| C08G 18/48 | (2006.01) |
| C08G 65/26 | (2006.01) |
| C08G 101/00 | (2006.01) |

(52) U.S. Cl.
CPC ............... *C11C 3/04* (2013.01); *C08G 18/36* (2013.01); *C08G 18/4072* (2013.01); *C08G 18/4841* (2013.01); *C08G 18/4866* (2013.01); *C08G 18/4883* (2013.01); *C08G 18/4891* (2013.01); *C08G 65/2606* (2013.01); *C08G 65/2663* (2013.01); *C11C 3/006* (2013.01); *C08G 2101/005* (2013.01); *C08G 2101/0008* (2013.01); *C08G 2101/0083* (2013.01)

(58) Field of Classification Search
CPC ............... C08G 18/14; C08G 18/4244; C08G 18/4261; C08G 18/4841; C08G 18/485; C08G 65/2606; C08G 65/2609; C08G 65/2615; C08G 65/2663; C08G 18/36; C08G 18/4866; C08G 18/4883; C08G 18/4891; C08G 18/4072; C08G 2101/0008; C08G 2101/005; C08G 2101/0083; C11C 3/04; C11C 3/006
See application file for complete search history.

(56) References Cited

U.S. PATENT DOCUMENTS

| | | | | |
|---|---|---|---|---|
| 5,332,764 | A  * | 7/1994 | Tairaka | ............... C08G 18/506 521/174 |
| 6,858,655 | B1 | 2/2005 | Hofmann et al. | |
| 8,598,248 | B2 * | 12/2013 | Hager et al. | .................. 521/174 |
| 2006/0073321 | A1 * | 4/2006 | Kaushiva | ........... C08G 18/7837 428/304.4 |
| 2006/0167125 | A1 | 7/2006 | Bauer et al. | |
| 2006/0229375 | A1 | 10/2006 | Hsiao et al. | |
| 2007/0123725 | A1 | 5/2007 | Lorenz | |
| 2007/0238798 | A1 | 10/2007 | McDaniel et al. | |
| 2008/0161509 | A1 | 7/2008 | Ostrowski et al. | |
| 2011/0269863 | A1 * | 11/2011 | Kunst et al. | .................. 521/172 |

FOREIGN PATENT DOCUMENTS

| | | |
|---|---|---|
| WO | 2011135027 A1 | 11/2011 |
| WO | 2012009008 A2 | 1/2012 |

OTHER PUBLICATIONS

Iwata, K.; Polyurethane Flexible Foam: Polyurethane Resin Handbook; Published by Nikkan Kogyo Shimbun, Ltd.; Sep. 25, 1987 First Impression appendix 1; pp. 178-181; Reprinting has been reproduced by the Patent Bureau in accordance with Copyright Law of Japan Section 42 Article 2 No. 1; this is an English Translation.

* cited by examiner

*Primary Examiner* — Rabon A Sergent
(74) *Attorney, Agent, or Firm* — Donald R. Palladino

(57) ABSTRACT

Polyols are produced by an alkoxylation process in which a vegetable oil containing hydroxyl functional groups is combined with a DMC catalyst to form a mixture, the DMC catalyst is then activated by adding ethylene oxide and/or propylene oxide to the vegetable oil/catalyst mixture, and ethylene oxide and propylene oxide are added to the mixture containing activated DMC catalyst in amounts such that the total of percentage of ethylene oxide in the polyol plus percentage of primary hydroxyl groups in the polyol produced is from 50 to 77% and the percentage of primary hydroxyl groups is at least 30% but less than 50%. These polyols are useful for the production of molded polyurethane foams, particularly, hot-cure molded polyurethane foams.

8 Claims, No Drawings

POLYOLS SUITABLE FOR HOT MOLDED FOAM PRODUCTION WITH HIGH RENEWABLE RESOURCE CONTENT

BACKGROUND OF THE INVENTION

The present invention relates to an alkoxylation process for the production of a polyol based on a renewable resource, the polyols produced by this process, a process for the production of molded foams produced from the polyols of the present invention and to the molded foams produced from the polyols of the present invention. The polyols of the present invention are particularly suitable for use in hot-cure molding processes.

Renewable resource polyols are gaining importance in the production of molded flexible foams. This has been driven largely by the increasing cost and limited supply of petroleum based polyols, but the "green" image of the renewable products has also become a significant factor in their increased usage. OEMs, retailers and government agencies are pushing for higher renewable resource content in the finished goods they sell or purchase to take advantage of the "green" image or to reduce the dependence on petroleum based materials.

In recent years, cold cure foams have dominated the flexible molded foam market. However, for optimum processing and foam properties, these typically require the use of low hydroxyl number polyols with high primary hydroxyl content. Because of these requirements, it has proven difficult to achieve greater than about 10% renewable resource content in cold cure molded foam without significantly diminishing processing and foam properties.

The "hot-cure" molded foam process relies on cycling the mold temperature from cold to hot and back and employs hot ovens to cure the foam that is produced. It is more energy intensive than the cold cure process and requires longer mold times. Hot molded foams typically have lower resilience and lower support factor, but their strength properties (tensile, elongation and tear), compression sets and air flow are generally better than cold molded foam. Lower density foams can be produced with acceptable compression sets; however, higher venting is required which increases extrusion scrap. Current commercial hot cure polyols are produced almost exclusively with petrochemical based raw materials, primarily ethylene oxide and propylene oxide. The ethylene oxide content of the most widely used hot-cure polyols ranges from about 8% to 15% with primary hydroxyl levels of from 40 to 60%.

Polyols with high renewable content that could be used to produce good quality hot-cure molded foams would be a welcome option for molded foam producers.

SUMMARY OF THE PRESENT INVENTION

It is an object of the present invention to provide a process for the production of polyols having a renewable content of at least 15% by weight, preferably at least 30% by weight.

It is another object of the present invention to provide polyols which are particularly suitable for use in the production of polyurethane molded foam by hot-cure molding processes.

It is a further object of the invention to provide such polyols that are essentially clear and stable against agglomeration or layering during extended storage.

These and other objects which will be apparent to those skilled in the art are accomplished by an alkoxylation process in which a vegetable oil containing hydroxyl groups is combined with a DMC catalyst to form a mixture, the DMC catalyst is then activated by adding ethylene oxide and/or propylene oxide to the vegetable oil/catalyst mixture, and ethylene oxide and propylene oxide are added to the mixture containing activated DMC catalyst in amounts such that the percentage by weight of ethylene oxide plus the percentage of primary hydroxyl groups (determined in accordance with techniques known to those skilled in the art) in the total polyol is from 50 to about 77%, the percentage of primary hydroxyl groups is greater than 30% but less than 50% and the percentage of ethylene oxide is from 20 to about 30%. Other suitable alkoxides in addition to EO and PO may be used in the alkoxylation process of present invention as long as the specified requirements for ethylene oxide content, primary hydroxyl group content and total amount of ethylene oxide plus primary hydroxyl group content of the present invention are met.

DETAILED DESCRIPTION OF THE INVENTION

It has now been demonstrated that good quality foams with a renewable resource content of >10%, preferably, >20% can be produced by a hot-mold process using polyols produced by alkoxylating a renewable resource material containing hydroxyl groups such as castor oil with EO and PO using a DMC catalyst. The ethylene oxide and propylene oxide are added to the mixture containing activated DMC catalyst in amounts such that the percentage by weight of ethylene oxide plus the percentage of primary hydroxyl groups in the polyol produced is from 50 to about 77%, preferably from 55 to about 75% and the primary hydroxyl group percentage is greater than 30% but less than 50%, preferably greater than 35% and up to about 45%, and the percentage by weight of ethylene oxide is from 20 to about 30%. Other suitable alkoxides in addition to EO and PO may be used in the alkoxylation process of present invention as long as the specified requirements for ethylene oxide content, primary hydroxyl group content and total amount of ethylene oxide plus primary hydroxyl group content of the present invention are met.

The renewable content by weight of the polyols of the present invention is at least 15%, preferably greater than 30%.

It has been unexpectedly found that these polyols can be used to produce hot cure molded foams of similar quality to foams produced with predominantly petrochemical based polyols.

It has also been unexpectedly found that these high renewable content polyols are suitable for production of good quality cold molded foam when used in blends with commercially available polyols used for cold molded foam production; wherein the high renewable content polyol is present in the blends at less than 60% by weight, preferably less than 35% by weight.

The present invention is described in greater detail in the Examples which follow.

The polyols of the present invention are derived from hydroxyl group-containing renewable resources and are preferably vegetable oil-based polyols. The preferred vegetable oil is castor oil, although other vegetable oils, such as soybean, sunflower, canola, linseed, cottonseed, tung, palm, poppy seed, corn and peanut oil can be hydroxylated or otherwise modified to make them useful in the present invention. The modified or hydroxylated oils may be used at up to 100% by weight of the initiator; preferably at up to 50% by weight in a blend with castor oil.

The other alkylene oxides that can be used along with ethylene oxide and propylene oxide in alkolating this vegetable oil include, but are not limited to 1,2- and 2,3-butylene oxide, isobutylene oxide, epichlorohydrin, cyclohexene oxide, styrene oxide, and the higher alkylene oxides such as the $C_5$-$C_{30}$ α-alkylene oxides. It is generally undesirable to employ ethylene oxide alone, but mixtures of propylene oxide and ethylene oxide with high ethylene oxide content, i.e. up to 85 mole percent, may be used effectively. Propylene oxide and mixtures of ethylene oxide with propylene oxide are preferred for alkoxylating the vegetable oil. It is most preferred to complete the alkoxylation with a mixture of ethylene oxide and propylene oxide that has a high ethylene oxide content. A short feed of up to 100% ethylene oxide may be used to complete the reaction while up to 85 mole percent, may be used effectively for longer capping processes. Alkoxylated polyols with >30% mole fraction of primary OH content are preferred and those with >35% are most preferred. Polyols produced in accordance with the present invention are typically clear or only slightly hazy and do not exhibit layering over extended storage periods.

Other polymerizable monomers may also be used in the practice of the present invention. Examples of other useful polymerizable monomers include: polycarboxylic anhydrides (phthalic anhydride, trimellitic anhydride, pyromellitic anhydride, methylendomethylene tetrahydrophthalic anhydride, endomethylene tetrahydrophthalic anhydride, chlorendic anhydride and maleic anhydride), lactones and other monomers as disclosed in U.S. Pat. Nos. 3,404,109; 5,145,883; and 3,538,043. The alkoxylated vegetable oil-based polyols may optionally be "capped" with ethylene oxide, as known in the art and disclosed, e.g., in U.S. Pat. Nos. 4,355,188; 4,721,818; and 5,563,221.

As mentioned above, the vegetable oil is alkoxylated in the presence of a double metal cyanide (DMC) catalyst. Any double metal cyanide (DMC) catalyst may be used. The resultant vegetable oil-based polyol will have a higher molecular weight which can result in improved comfort in the polyurethane foams made with that polyol. Suitable double metal cyanide (DMC) catalysts are known to those skilled in the art.

Double metal cyanide complex (DMC) catalysts are non-stoichiometric complexes of a low molecular weight organic complexing agent and optionally other complexing agents with a double metal cyanide salt, e.g., zinc hexacyanocobaltate.

Exemplary double metal cyanide (DMC) complex catalysts suitable for use in alkoxylating the vegetable oil in accordance with the present invention include those suitable for preparation of low unsaturation polyoxyalkylene polyether polyols, such as those disclosed in U.S. Pat. Nos. 3,427,256; 3,427,334; 3,427,335; 3,829,505; 4,472,560; 4,477,589; and 5,158,922. The more preferred double metal cyanide (DMC) catalysts more preferred are those capable of preparing "ultra-low" unsaturation (i.e., <0.002 meq/g) polyether polyols. Such catalysts are disclosed in U.S. Pat. Nos. 5,470,813 and 5,482,908, and 5,545,601, the entire contents of which are herein incorporated by reference thereto. Particularly preferred catalysts for use in the present invention are those zinc hexacyanocobaltate catalysts prepared by the methods described in U.S. Pat. No. 5,482,908.

The DMC catalyst concentration is chosen to ensure good control of the polyoxyalkylation reaction under the given reaction conditions. The catalyst concentration is preferably in the range of from 0.0005 wt. % to 1 wt. %, more preferably, from 0.001 wt. % to 0.1 wt. %, most preferably from 0.001 to 0.01 wt. %, based on the amount of polyol to be produced. The DMC catalyst may be used in an amount ranging between any combination of these values, inclusive of the recited values.

As those skilled in the art are aware, an organic complexing ligand may be included with the DMC catalyst. Any organic complexing ligand may be part of the DMC catalyst in the process of the present invention, such as the organic complexing ligands described in U.S. Pat. Nos. 3,404,109, 3,829,505, 3,941,849, 5,158,922 and 5,470,813, as well as in EP 0,700,949, EP 0,761,708, EP 0,743,093, WO 97/40086 and JP 4,145,123. Such organic complexing ligands include water-soluble organic compounds with heteroatoms, such as oxygen, nitrogen, phosphorus or sulfur, which can form complexes with the DMC compound. Preferred organic complexing ligands are alcohols, aldehydes, ketones, ethers, esters, amides, ureas, nitriles, sulfides and mixtures thereof. More preferred organic complexing ligands include: water-soluble aliphatic alcohols such as ethanol, isopropanol, n-butanol, iso-butanol, sec-butanol and tert-butanol. Tert-butanol is most preferred.

The DMC catalysts may optionally contain at least one functionalized polymer. "Functionalized polymer" as used herein is a polymer or its salt that contains one or more functional groups including oxygen, nitrogen, sulfur, phosphorus or halogen. Examples of functionalized polymers preferred in the inventive process include, but are not limited to, polyethers, polyesters, polycarbonates, polyalkylene glycol sorbitan esters, polyalkylene glycol glycidyl ethers, polyacrylamides, poly(acrylamide-co-acrylic acids), polyacrylic acids, poly(acrylic acid-co-maleic acids), poly(N-vinylpyrrolidone-co-acrylic acids), poly(acrylic acid-co-styrenes) and the salts thereof, maleic acids, styrenes and maleic anhydride copolymers and the salts thereof, block copolymers composed of branched chain ethoxylated alcohols, alkoxylated alcohols such as NEODOL (sold commercially by Shell Chemical Co.), polyacrylonitriles, polyalkyl acrylates, polyalkyl methacrylates, polyvinyl methyl ethers, polyvinyl ethyl ethers, polyvinyl acetates, polyvinyl alcohols, poly-N-vinylpyrrolidones, polyvinyl methyl ketones, poly(4-vinylphenols), oxazoline polymers, polyalkyleneimines, hydroxyethylcelluloses, polyacetals, glycidyl ethers, glycosides, carboxylic acid esters of polyhydric alcohols, bile acids and their salts, esters or amides, cyclodextrins, phosphorus compounds, unsaturated carboxylic acid esters and ionic surface- or interface-active compounds. Polyether polyols are most preferably used as the functionalized polymer.

Where used, functionalized polymers may be present in the DMC catalyst in an amount of from 2 to 80 wt. %, preferably, from 5 to 70 wt. %, more preferably, from 10 to 60 wt. %, based on the total weight of DMC catalyst. The functionalized polymers may be present in the DMC catalyst in an amount ranging between any combination of these values, inclusive of the recited values. In addition, a catalyst polyol suspension, such as that described in U.S. Pat. No. 6,699,961, may be used.

The DMC catalysts used in alkoxylating the vegetable oil may be employed in semi-batch, continuous and other reactor configurations. As known to those skilled in the art, the semi-batch process is widely used to prepare polyethers and polyether-ester polyols. Reactors for these processes are known to utilize a range of mixing conditions with energy inputs from 0.5 to 20 horsepower per 1,000 gal. and mixing energies of fro 1 to 8 hp per 1,000 gal. proving to be particularly useful. Those skilled in the art will appreciate that the optimum energy input may vary with process parameters such oxide addition time and with product viscosity. For example, a greater amount of energy may be preferred for products with higher viscosities. Other process conditions which may be useful include purging the reactor oxide-feed tube or pipe with nitrogen or another inert fluid or gas after completion of the oxide feed.

In a continuous reactor to produce polyethers, the DMC catalyst can be charged to the reactors as a slurry in polyether or as a powder. A wide range of polyethers can be used as the suspension agent for slurries including various glycols such propylene glycol, 1,4-butane diol, ethylene glycol and alkoxylates of dials. Various trials, tetrols, pentols, etc. and alkoxylates of these alcohols may also be used. The selection of a suspending agent may depend on a number of factors including availability at that site and product parameters such as viscosity. In some instances, it may be particularly desirable to use a high-shear mixer or similar device to create a suspension with a low tendency to settle while it is in the catalyst charge vessel.

In those polyol production processes designed to operate at low DMC catalyst levels, propylene oxide quality and ethylene oxide quality may be important in obtaining a stable process and in producing a product with low amounts of contaminants. Low levels of alkalinity or water in the propylene oxide can potentially inhibit or deactivate the catalyst, thereby resulting in high propylene oxide concentrations in the reactors and creating a safety hazard. The permissible water and alkalinity ranges are dependent on both catalyst level and catalyst activity. For systems designed to operate at DMC catalyst levels in the range of from 20 to 30 ppm, a propylene oxide alkalinity of less than 3 ppm (as potassium hydroxide) is preferred. The limiting values for alkalinity and water content will vary depending on the molecular weight of the polyol. These parameters are more important in the alkoxylation of low molecular weight polyols. In polyol production processes operating near the process limits, water levels in the range of several hundred ppm to a thousand ppm can affect process stability. The limiting values of these components may also be related to process type. The continuous process and the semi-batch process with the continuous addition of a low molecular weight starter are more sensitive than a conventional semi-batch process.

The organic components in the ethylene oxide and propylene oxide are less important for process stability than the water content or alkalinity; however, the presence of these materials can affect product quality. Propylene oxide can contain high molecular weight polypropylene oxide that can affect the foaming process in the reaction of polyols and isocyanates to form polyurethane foams. High molecular weight polypropylene oxide can either cause foam collapse or affect cell size. It may be necessary to use a carbon treatment of the propylene oxide or to use other processes to remove the high molecular weight polypropylene oxide. Low molecular weight components like propionaldehyde, methyl formate, methyl propylether, methyl isopropylether, acetaldehyde, and furan may require an additional polyol process step to remove these components prior to foam manufacture. These light components can generally be removed by a stripping process.

The vegetable oil-based polyols preferably have a nominal functionality in the range of from 1.5 to 6, more preferably, from 2 to 4 and a molecular weight in the range of from 1200 to 10,000, preferably from 2000 to 7,000, and most preferably from 2500 to 4000 Da. The vegetable oil-based polyols useful in making the flexible foams of the present invention may have a functionality and molecular weight in an amount ranging between any combination of these values, inclusive of the recited values.

Suitable polyisocyanates are known to those skilled in the art and include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Examples of such isocyanates include those represented by the formula,

Q(NCO)$_n$ in which n is a number from 2-5, preferably 2-3, and Q is an aliphatic hydrocarbon group containing 2-18, preferably 6-10, carbon atoms; a cycloaliphatic hydrocarbon group containing 4-15, preferably 5-10, carbon atoms; an araliphatic hydrocarbon group containing 8-15, preferably 8-13, carbon atoms; or an aromatic hydrocarbon group containing 6-15, preferably 6-13, carbon atoms.

Examples of suitable isocyanates include: ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (isophorone diisocyanate; e.g. German Auslegeschrift 1,202,785 and U.S. Pat. No. 3,401,190); 2,4- and 2,6-hexahydro-toluene diisocyanate and mixtures of these isomers; dicyclohexyl-methane-4,4'-diisocyanate (hydrogenated MDI, or HMDI); 1,3- and 1,4-phenylene diisocyanate; 2,4- and 2,6-toluene diisocyanate and mixtures of these isomers (TDI); diphenyl-methane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI), which are described, for example, in GB 878,430 and GB 848,671; norbornane diisocyanates, such as those described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in GB 994,890, BE 761,616, and NL 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in GB 889,050; polyisocyanates obtained by telomerization reactions of the type described, for example, in U.S. Pat. No. 3,654,106; polyisocyanates containing ester groups of the type described, for example, in GB 965,474 and GB 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. Those skilled in the art will recognize that it is also possible to use mixtures of the polyisocyanates described above.

In general, it is preferred to use readily available polyisocyanates, such as 2,4- and 2,6-toluene diisocyanates and mixtures of these isomers (TDI); polyphenyl-polymethylene-polyisocyanates of the type obtained by condensing aniline with formaldehyde, followed by phosgenation (crude MDI); and polyisocyanates containing carbodiimide groups, urethane groups, allophanate groups, isocyanurate groups, urea groups, or biuret groups (modified polyisocyanates).

Isocyanate-terminated prepolymers may also be employed in the preparation of the flexible foams of the present invention. Prepolymers may be prepared by reacting an excess of organic polyisocyanate or mixtures thereof with a minor amount of an active hydrogen-containing compound as determined by the well-known Zerewitinoff test, as described by Kohler in "Journal of the American Chemical Society," 49, 3181(1927). These compounds and their methods of preparation are well known to those skilled in the art. The use of any one specific active hydrogen compound is not critical; any such compound can be employed in the practice of the present invention.

The inventive polyurethane forming formulation optionally may include one or more non-alkoxylated vegetable oil based polyols that contain naturally occurring hydroxyl groups (for example, castor oil) or which have been hydroxylated by various processes known to those in the art to form hydroxyl functional groups on the oils. In addition, the formulations may optionally contain non-vegetable oil-based (i.e., petrochemically derived) polyols such as polyethers, polyesters, polyacetals, polycarbonates, polyesterethers, polyester carbonates, polythioethers, polyamides, polyesteramides, polysiloxanes, polybutadienes and polyacetones. The non-vegetable oil-based polyol(s) may preferably be made in the presence of double metal cyanide (DMC) catalysts.

Where the polyol(s) of the present invention are used in combination with other types of polyols in a polyol component to be reacted with a polyisocyanate, it is preferred that the polyol component include at least 30% by weight of the polyol(s) of the present invention, more preferably, at least 60% by weight of the polyol(s) of the present invention.

Suitable additives which may optionally be included in the polyurethane forming formulations of the present invention include, for example, blowing agents, foam stabilizers, catalysts, cell regulators, reaction inhibitors, flame retardants, plasticizers, pigments, fillers, etc.

Water is generally the only blowing agent used to produce the molded foams of the present invention. However, it is possible but not preferred, to include any of the other known blowing agents in the foam-forming mixture. Examples of suitable optional blowing agents include $CO_2$; methylene chloride: HFC's and HCFC's; alkanes, such as pentane, isopentane and/or cyclopentane; and/or inorganic blowing agents such as air and inert gases. The amount of blowing agent required to produce a foam having the desired density may be readily determined by one skilled in the art.

Foam stabilizers which may be considered suitable for use in the inventive process include, for example, polyether siloxanes, and preferably those which are insoluble in water. Compounds such as these are generally of such a structure that copolymers of ethylene oxide and propylene oxide are attached to a polydimethylsiloxane residue. Such foam stabilizers are described in, for example, U.S. Pat. Nos. 2,834,748, 2,917,480 and 3,629,308. Preferred silicone surfactants are those used for the production of hot-cure molded foam. These are often the same as or very similar to silicone copolymers used in the production of conventional free-rise foams. Suitable examples include Tegostab B 4900 and B 8040 LV from Evonik and NIAX L820 and L 635 from Momentive Performance Materials. Many other suitable silicones are available and are known to those in the art.

Catalysts suitable for the flexible foam forming process of the present invention include those which are known in the art. These catalysts include, for example, tertiary amines, such as triethylamine, tributylamine, N-methylmorpholine, N-ethylmorpholine, tetramethylethylene-diamine, pentamethyl-diethylenetriamine and higher homologues (as described in, for example, DE-A 2,624,527 and 2,624,528), 1,4-diaza-bicyclo(2.2.2)octane, N-methyl-N'-dimethylaminoethylpiperazine, bis-(dimethylaminoalkyl)piperazines, N,N-dimethylbenzylamine, N,N-dimethyl-cyclohexylamine, N,N-diethylbenzylamine, bis-(N,N-diethylaminoethyl)adipate, N,N,N',N'-tetramethyl-1,3-butanediamine, N,N-dimethyl-p-phenylethylamine, 1,2-dimethylimidazole, 2-methylimidazole, monocyclic and bicyclic amines together with bis-(dialkylamino)alkyl ethers, such as 2,2-bis-(dimethylaminoethyl)ether.

Other suitable catalysts which may be used in producing the polyurethane foams of the present invention include organometallic compounds, and particularly, organotin compounds. Organotin compounds which may be considered suitable include those organotin compounds containing sulfur. Such catalysts include, for example, di-n-octyltin mercaptide. Other types of suitable organotin catalysts include, preferably tin(II) salts of carboxylic acids such as, for example, tin(II) acetate, tin(II) octoate, tin(II) ethylhexoate and/or tin(II) laurate, and tin(IV) compounds such as, for example, dibutyltin oxide, dibutyltin dichloride, dibutyltin diacetate, dibutyltin dilaurate, dibutyltin maleate and/or dioctyltin diacetate.

Further examples of suitable additives, which may optionally be included in the flexible polyurethane foams of the present invention can be found in Kunststoff-Handbuch, volume VII, edited by Vieweg & Hochtlen, Carl Hanser Verlag, Munich 1993, 3rd Ed., pp. 104 to 127, for example.

The following examples illustrate that the performance properties of foams produced via a hot-cure molded process using the polyols of the current invention are essentially identical to foams made from petroleum-based polyols. The examples further demonstrate the excellent performance of castor oil initiated polyols (~35% renewable content) that are alkoxylated with DMC catalysts. Polyols initiated with hydroxylated renewable oils or combinations of castor oil and other hydroxylated renewable oil are also shown to produce good quality hot-cure molded foams. Examples are also provided showing that these polyols can be used in blends with polyols used in standard cold cure processes to produce good quality cold cure molded foam. Such cold cure molding process polyols are well known to those in the art and typically have primary hydroxyl contents of greater than 60% and usually greater than 70%.

EXAMPLES

The present invention is further illustrated, but is not to be limited, by the following examples. All quantities given in "parts" and "percents" are understood to be by weight, unless otherwise indicated.

POLYOL A: A 56 hydroxyl number polyether started with glycerin having a total of 11% ethylene oxide (5% added in a mixed block and 6% added as an end cap) made using KOH as the catalyst.

POLYOL B: A 31.5 hydroxyl number polyether co-started with glycerin and sorbitol (72/28 weight %) with a total of 17.5% ethylene oxide added as an end cap made using KOH as the catalyst.

POLYOL C: A 20 hydroxyl number polymer polyol containing 43% poly(acrylonitrile/styrene) (37/63 weight %) solids dispersed in a 36 hydroxyl number glycerin-based polyether.

POLYOLS D through K were prepared as follows:

A 28 liter pressure reactor was equipped with multiple feed systems, process control, heat/cooling capability, safety relief system and vacuum capability. The reactor system was purged with nitrogen and evacuated and Castor Oil and/or Hydroxylated Soybean Oil were charged to the reactor along with DMC catalyst to give a final concentration of 60 ppm catalyst in the product. The double metal cyanide ("DMC") catalyst used was made according to U.S. Pat. No. 5,482,908. The reactor was inerted with nitrogen and heated to 130° C. The system was vacuum stripped for 30 minutes at 130° C. with a nitrogen purge. The reactor was inerted with 20 psia of nitrogen and propylene oxide and ethylene oxide were added to activate the catalyst.

After the reactor pressure decreased, the PO and EO feeds were restarted at a specified feed ratio that was high in PO content (90/10 PO/EO) at the maximum oxide feed rate (backbone feed). After the desired amount of ethylene oxide was fed to the reactor, the backbone feed ratio was changed to a specified ratio high in EO content to achieve the desired polyol properties (tip feed). The oxide feed ratio change from the backbone ratio to the tip ratio was achieved by a gradually ramping of the oxide feeds or by an instantaneous step change of the oxide feeds. The overall oxide feed time was from 3.5 to 4 hours. After digestion at 130° C. for 1 hour, the polyether was stripped to remove any unreacted propylene oxide or ethylene oxide. Antioxidant was added and the polyether was then cooled and discharged. The specific process conditions and characteristics of the POLYOLS produced by this procedure were as follows:

POLYOL D: Hydroxylated Soybean oil (Argol 4.0 by BioBased Technologies) started with 100 ppm phosphoric acid added to starter/catalyst mixture prior to activation with PO and EO; 3.5% of the EO added at a PO/EO ratio of 90/10 followed by 25% of the EO alkoxylated at PO/EO ratio of 25/75; OH Number=56.7; Total EO content=28.5%; Primary hydroxyl=31.3%.

POLYOL E: Castor oil initiated; 5.6% of the EO added at a PO/EO ratio of 90/10 followed by 15% of the EO alkoxylated at PO/EO ratio of 35/65; OH Number=56.1; Total EO content=20.6%; Primary hydroxyl=33%.

POLYOL F: Castor oil initiated; 4.1% of the EO added at a PO/EO ratio of 90/10 followed by 25% of the EO alkoxylated at PO/EO ratio of 35/65; OH Number=55.9; Total EO content=29.1%; Primary hydroxyl=35.8%.

POLYOL G: Castor oil initiated; 5.5% of the EO added at a PO/EO ratio of 90/10 followed by 20% of the EO alkoxylated at PO/EO ratio of 25/75; OH Number=56.2; Total EO content=25.5%; Primary hydroxyl=37.3%.

POLYOL H: Castor oil and hydroxylated Soybean oil (Agrol 4.0 by BioBased Technologies) 50/50 weight % started with 100 ppm phosphoric acid added to the starter/catalyst mixture prior to activation with PO/EO; 4.2% of the EO added at a PO/EO ratio of 90/10 followed by 25% of the EO alkoxylated at PO/EO ratio of 25/75; OH Number=55.9; Total EO content=29.2%; Primary hydroxyl=38.3%.

POLYOL I: Castor oil initiated; 5.1% of the EO added at a PO/EO ratio of 90/10 followed by 25% of the EO alkoxylated at PO/EO ratio of 20/80; OH Number=54.8; Total EO content=30.1%; Primary hydroxyl=45.8%.

POLYOL J: Castor oil initiated; 5.4% of the EO added at a PO/EO ratio of 90/10 followed by 25% of the EO alkoxylated at PO/EO ratio of 15/85; OH Number=56.8; Total EO content=30.4%; Primary hydroxyl=47.8%.

POLYOL K: Castor oil initiated; 6.2% of the EO added at a PO/EO ratio of 90/10 followed by 30% of the EO alkoxylated at PO/EO ratio of 15/85; OH Number=56.1; Total EO content=36.2%; Primary hydroxyl=52.6%.

Examples 1-9

Flexible polyurethane foams were produced via a simulated hot-cure molded process using 100 parts by weight (pbw) of the POLYOL indicated in Table 1; 3.50 pbw of distilled water; 1.0 pbw of the silicone surfactant which is commercially available from Evonik under the name B-4900; 0.10 pbw of the stannous octoate catalyst which is commercially available from Air Products under the name Dabco T-9; 0.15 pbw of the amine catalyst commercially available from Momentive Performance Materials under the name Niax A-1; and toluene diisocyanate commercially available from Bayer MaterialScience as Mondur TD-80, in an amount necessary to achieve an NCO/OH Index of 100. The foam-forming mixture was introduced into a 15×15×4 inch aluminum mold at a temperature of 40° C. The mold temperature was then immediately increased to 110° C. and the reaction mixture was allowed to foam in that mold for a period of 20 minutes. The molded foam was then cooled and removed from the mold. The foams were allowed to cure at ambient temperature for seven days before physical properties were measured. The properties of these foams measured in accordance with the procedure described in ASTM D 3574 and other standard test methods known to those in the art. These measured properties are also reported in Table 1.

TABLE 1

| | Example | | | | | | | | |
|---|---|---|---|---|---|---|---|---|---|
| | 1* | 2 | 3 | 4 | 5 | 6 | 7 | 8* | 9* |
| POLYOL | A | D | E | F | G | H | I | J | K |
| % EO in Polyol | 13.3 | 28.5 | 20.6 | 29.1 | 25.5 | 29.2 | 30.1 | 30.4 | 36.2 |
| % Primary OH | 45 | 31.3 | 33 | 35.8 | 37.3 | 38.3 | 45.8 | 47.8 | 52.6 |
| % EO + % Primary OH | 58.3 | 59.8 | 53.6 | 64.9 | 62.8 | 67.5 | 75.9 | 78.2 | 88.8 |
| % Renewable in Polyol | 3.1 | 45.2 | 34.6 | 34.6 | 34.6 | 39.2 | 34.6 | 34.6 | 34.6 |

TABLE 1-continued

| | Example | | | | | | | | |
|---|---|---|---|---|---|---|---|---|---|
| | 1* | 2 | 3 | 4 | 5 | 6 | 7 | 8* | 9* |
| % Renewable in Foam | <2.5 | 31 | 24 | 24 | 24 | 27 | 24 | 24 | 24 |
| Polyol Appearance | clear | Hazy bottom | clear | clear | clear | very slight hazy | clear | Hazy | Hazy |
| Density (lb/ft$^3$) | 1.86 | 2.15 | 1.92 | 2.07 | 1.91 | 2.08 | 2.11 | 2.05 | 1.93 |
| Resilience (%) | 48 | 37 | 43 | 46 | 45 | 39 | 44 | 44 | 27 |
| Air Flow (ft$^3$/min) | 3.50 | 4.2 | 4.87 | 4.33 | 4.47 | 3.81 | 3.15 | 1.97 | 0.02 |
| IFD Height (in) | 3.60 | 3.5 | 3.54 | 3.55 | 3.57 | 3.54 | 3.5 | 3.45 | 3.63 |
| IFD 25% (lb/50 in$^2$) | 33 | 27 | 29 | 34 | 33 | 32 | 37 | 34 | 36 |
| IFD 50% (lb/50 in$^2$) | 51 | 43 | 48 | 53 | 51 | 49 | 57 | 54 | 57 |
| IFD 65% (lb/50 in$^2$) | 71 | 62 | 70 | 74 | 72 | 70 | 80 | 77 | 81 |
| IFD 25% Return (lb/50 in$^2$) | 25 | 20 | 22 | 26 | 25 | 24 | 28 | 25 | 26 |
| Return Val. @ 25% | 76 | 74 | 73 | 76 | 75 | 74 | 77 | 74 | 73 |
| S.F. 50%/25% | 1.54 | 1.59 | 1.64 | 1.54 | 1.54 | 1.54 | 1.53 | 1.58 | 1.6 |
| S.F. 65%/25% | 2.17 | 2.34 | 2.39 | 2.17 | 2.15 | 2.2 | 2.17 | 2.26 | 2.28 |
| CFD 50% (psi) | 0.51 | 0.47 | 0.5 | 0.55 | 0.53 | 0.47 | N/A | 0.56 | 0.57 |
| Tensile Str. (psi) | 18.4 | 16.6 | 13.2 | 22.7 | 18.3 | 15.2 | 21.2 | 18.9 | 18.2 |
| Elongation (%) | 131 | 68.4 | 94.5 | 125 | 140 | 97.3 | 113 | 121 | 120 |
| ASTM Tear (pli) | 2.74 | 1.19 | 1.93 | 4.00 | 3.58 | 1.87 | 2.20 | 2.53 | 1.92 |
| Comp. Set. 50% | 2.88 | 4.03 | 1.89 | 3.22 | 2.30 | 2.82 | 2.57 | 3.01 | 4 |
| HA Ld Loss 50% | 3.54 | 12.77 | 6.00 | 9.09 | 4.76 | 0.00 | N/A | 7.14 | 5.26 |
| HACS 50% | 4.25 | 6.62 | 4.29 | 3.88 | 4.43 | 5.57 | 4.82 | 8.15 | 7.99 |
| Wet Set 50% | 4.93 | 9.46 | 6.33 | 5.11 | 3.61 | 5.76 | 6.16 | 8.88 | 6.12 |

*Comparative Example
IFD = Indentation Force Deflection
SF = Support Factor
CFD = Compression Force Deflection
HA Ld Loss = Humid Age Load Loss
HACS = Humid Age Compression Set Examples 10-14

Flexible polyurethane foams were produced by a standard high resilience (HR) "Cold" Molded process using 45 parts by weight (pbw) of the POLYOL C and 55 pbw of the POLYOL B or other POLYOL and/or combination of the two as indicated in Table 2; 2.25 pbw of distilled water; 0.5 pbw of the silicone surfactant which is commercially available from Air Products under the name DC-5169; 0.3 pbw of the silicone surfactant which is commercially available from Air Products under the name DC-5164; 0.30 pbw of the amine catalyst which is commercially available from Momentive Performance Materials under the name Niax A-33; 0.10 pbw of the amine catalyst commercially available from Momentive Performance Materials under the name Niax A-1; and toluene diisocyanate commercially available from Bayer MaterialScience as Mondur TD-80, in an amount necessary to achieve an NCO/OH Index of 100. The foam-forming mixture was introduced into a 15×15×4 inch aluminum mold at 65.6° C. and the reaction mixture was allowed to foam in that mold for a period of 5.0 minutes. The molded foam was removed from the mold and allowed to cure for seven days before physical properties were tested by ASTM standard procedures. The physical properties of these foams are also reported in Table 2.

TABLE 2

| | Example | | | | |
|---|---|---|---|---|---|
| | 10* | 11 | 12 | 13 | 14 |
| 45 pbw POLYOL | C | C | C | C | C |
| 55 pbw POLYOL | B | F | | G | |
| 27.5 pbw POLYOL | | | B | | B |
| 27.5 pbw POLYOL | | | F | | G |
| % Renewable in Polyol | 1.4 | 20 | 11 | 20 | 11 |
| % Renewable in Foam | 1.0 | 15 | 8.0 | 15 | 8.0 |
| Polyol Appearance | Clear | Clear | Clear | Clear | Clear |
| Density (lb/ft$^3$) | 3.51 | 3.6 | 3.57 | 3.54 | 3.58 |
| Resilience (%) | 68 | 44 | 61 | 36 | 61 |
| Air Flow (ft$^3$/min) | 1.81 | 0.01 | 1.21 | 0.01 | 1.24 |
| ASTM IFDHt(in) | 3.93 | 3.89 | 3.92 | 3.49 | 4.09 |
| IFD25% (lb/50 in$^2$) | 55 | 50 | 55 | 47 | 53 |
| IFD50% (lb/50 in$^2$) | 98 | 92 | 97 | 92 | 96 |
| IFD65% (lb/50 in$^2$) | 150 | 140 | 149 | 147 | 147 |
| IFD25% Return (lb/50 in$^2$) | 47 | 39 | 44 | 37 | 43 |
| ReturnVal @25% | 85 | 79 | 81 | 79 | 81 |
| S.F. 50%/25% | 1.76 | 1.85 | 1.78 | 1.95 | 1.82 |
| S.F. 65%/25% | 2.71 | 2.81 | 2.72 | 3.09 | 2.8 |

TABLE 2-continued

|  | Example | | | | |
| --- | --- | --- | --- | --- | --- |
|  | 10* | 11 | 12 | 13 | 14 |
| CFD 50% (psi) | 0.98 | 0.9 | 0.94 | 0.9 | 0.97 |
| Tensile Str. (psi) | 24.20 | 28.31 | 22.46 | 27.08 | 23.82 |
| Elongation (%) | 64.88 | 65.18 | 52.1 | 58.35 | 54.24 |
| ASTM Tear (pli) | 1.63 | 1.41 | 1.56 | 1.48 | 3.25 |
| Comp. Set. 50% | 9.48 | 18.46 | 13.15 | 16.18 | 12.35 |
| HA Ld Loss 50% | 7.65 | 11.11 | 5.32 | 7.78 | 8.35 |
| HACS 50% | 13.35 | 25.99 | 18.84 | 28.92 | 17.66 |
| Foam shrinkage | NIL | MODERATE | SLIGHT | MODERATE | SLIGHT |

*Comparative Example
IFD = Indentation Force Deflection
SF = Support Factor
CFD = Compression Force Deflection
HA Ld Loss = Humid Age Load Loss
HACS = Humid Age Compression Set Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An alkoxylation process for the production of a polyol based on a renewable resource that is suitable for producing molded polyurethane foams comprising:
    a) combining a vegetable oil containing hydroxyl functional groups with a DMC catalyst to form a mixture,
    b) adding ethylene oxide and/or propylene oxide and optionally, one or more other alkoxides to the mixture from a) to activate the DMC catalyst,
    c) adding ethylene oxide, propylene oxide, and optionally, one or more other alkoxides to the mixture containing activated DMC catalyst from b) in amounts such that the total of the percentage by weight of ethylene oxide in the polyol plus the mole percentage of primary hydroxyl groups in the polyol produced is from 50 to 77% and the mole percentage of primary hydroxyl groups is at least 30% but less than 50%.

2. The process of claim 1 in which the amount of ethylene oxide in the polyol produced is between 20 and 30% by weight.

3. The process of claim 1 in which the ethylene oxide is added in an amount such that the percentage of primary hydroxyl groups in the polyol is less than 45%.

4. The process of claim 1 in which the vegetable oil is castor oil.

5. A process for the production of a molded polyurethane foam comprising:
    a) forming a polyurethane-forming mixture by combining
        (i) a polyisocyanate component comprising at least one polyisocyanate, and
        (ii) a polyol component comprising a polyol produced by the alkoxylation process of claim 1
    b) introducing the polyurethane-forming mixture into a mold;
    c) cycling the temperature of the mold, and
    d) curing the polyurethane foam in a heated oven.

6. The process of claim 5, wherein the amount of ethylene oxide in the polyol is 20% by weight.

7. The process of claim 5 in which the amount of ethylene oxide in the polyol is 30% by weight.

8. The process of claim 5, wherein the vegetable oil is castor oil.

* * * * *